Dec 29, 1953
J. S. CROMEANS
2,664,434
RECOVERY OF OXGENATED ORGANIC COMPOUNDS
Filed June 24, 1949
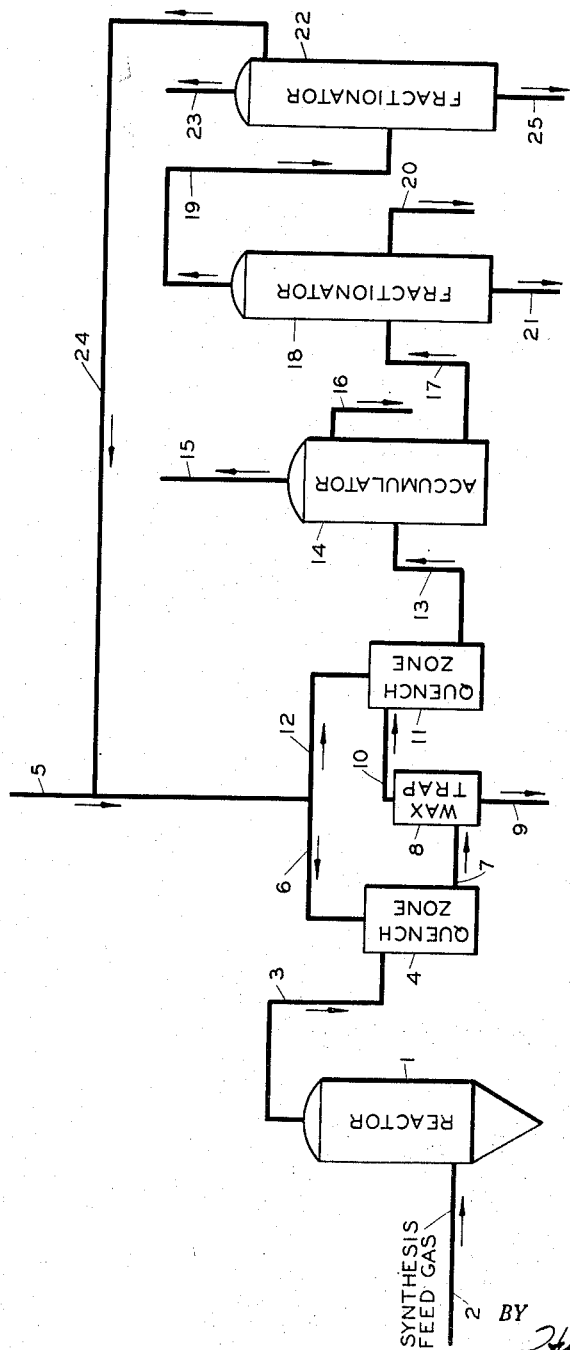
INVENTOR.
J. S. CROMEANS
BY
*Hudson and Young*
ATTORNEYS Patented Dec. 29, 1953

2,664,434

UNITED STATES PATENT OFFICE 2,664,434

RECOVERY OF OXYGENATED ORGANIC COMPOUNDS

John S. Cromeans, Dewey, Okla., assignor to Phillips Petroleum Company, a corporation of Delaware Application June 24, 1949, Serial No. 101,225

5 Claims. (Cl. 260—450)

The invention relates to the recovery of oxygenated organic compounds. In one aspect this invention relates to the recovery of oxygenated organic compounds resulting from catalytic hydrogenation of a carbon oxide. In a specific embodiment this invention relates to the recovery of oxygenated organic compounds resulting from catalytic hydrogenation of carbon monoxide by concentrating the oxygenated compounds in the aqueous phase of the reaction product.

In the catalytic hydrogenation of a carbon oxide, a product comprising hydrocarbons and oxygenated hydrocarbon derivatives is obtained in relative yields dependent upon the choice of catalyst and of hydrogenation conditions. For example, hydrogen and carbon monoxide may be passed into a catalytic zone containing an iron catalyst suitable for the production of hydrocarbons as the principal reaction product. During the reaction oxygenated organic compounds, water and carbon dioxide are also formed. The recovery of these oxygenated organic compounds presents a complex problem and involves the use of many processing steps. The total normally liquid product is readily separable into a hydrocarbon phase and an aqueous phase, and the oxygenated compounds are distributed throughout both phases. Usually the concentration of oxygenated compounds in the aqueous phase varies from one to twelve per cent, depending upon the catalyst used and the method of operation. With the same catalyst and operating conditions the concentration of oxygenated compounds in the hydrocarbon phase has been found to vary from one to fifteen per cent. Even higher concentrations in both phases are obtainable by effecting the hydrogenation reaction with an iron catalyst at a relatively low temperature, within the range of 190 to 225° C. and by using a hydrogen to carbon monoxide ratio in the synthesis gas feed that approaches 1:1.

The recovery of oxygenated organic compounds from the hydrogenation reaction products is usually accomplished by condensation and separation of the normally liquid products into an aqueous phase and a hydrocarbon phase with subsequent processing of each phase to recover the oxygenated organic compounds. A major disadvantage in treating the hydrocarbon and aqueous phase separately to recover the oxygenated reaction products is due to the fact that the number of individual compounds to be separated from either of the phases is so large and the amount of each compound to be separated is so small that many processing steps are required. Furthermore, many of these processing steps used in processing one phase are duplicates of those used in recovering the oxygenated compounds from the other phase since some of the oxygenated compounds are present in both phases.

It is an object of this invention to provide an improved process for the recovery of oxygenated organic compounds.

It is another object of this invention to provide an improved process for the recovery of oxygenated organic compounds resulting from the catalytic hydrogenation of a carbon oxide.

It is a further object of this invention to provide an improved process for the recovery of oxygenated organic compounds resulting from the catalytic hydrogenation of carbon monoxide by concentrating the oxygenated compounds in the aqueous phase of the reaction product.

It is a further object of this invention to alter the phase relationship between the aqueous and hydrocarbon phases resulting from the catalytic hydrogenation of carbon monoxide by the introduction of a chemical compound to the hydrogenation reaction product and thus concentrating the oxygenated organic compounds in the aqueous phase.

Additional objects of my invention will be manifest from my disclosure contained herein.

I have found that in the normally liquid reaction product resulting from the catalytic hydrogenation of carbon monoxide the concentration of oxygenated compounds in the aqueous phase can be increased and the concentration of oxygenated compounds in the hydrocarbon phase can be accordingly reduced by adding a low-boiling aliphatic alcohol to the hydrogenation reaction effluent.

The accompanying diagrammatic drawing represents one method and an arrangement of apparatus for effecting my process. Such conventional equipment as pumps, valves, compressors, and the like have not been included in the drawing to facilitate the understanding of my process. Their inclusion and numerous variations of my process will be readily obvious to one skilled in the art.

In accordance with my process a suitable solvent such as a low-boiling aliphatic alcohol, is injected into the product stream issuing from a reaction zone wherein carbon monoxide is catalytically hydrogenated. This injection of solvent may be made at any point in the process between the removal of products from the reaction zone and the separation of the product into normally liquid aqueous and hydrocarbon phases. If the reaction product stream is processed in any manner before the aqueous and hydrocarbon phases are separated, such as reaction product condensation, wax removal, and the like, the solvent may be introduced either prior to or subsequent to any of these processing steps. Also, if desired, the solvent may be introduced to the reaction product during the step of separating the aqueous and hydrocarbon phases, but it is necessary that adequate mixing be provided during the separation in order that the solvent can effect an increase of concentration of oxygenated organic compounds in the aqueous phase.

In processing the products from the hydrogenation reaction I prefer to add solvent to the product stream immediately following the removal of product from the reaction zone. The reaction temperature, when a fluidized iron catalyst is used, is usually within the range of 295 to 320° C. Only sufficient solvent is added to reduce the temperature of the product stream to 200 to 260° C. to condense the heavy, waxy hydrocarbon reaction products which are subsequently removed by passage of the quenched reaction products through a wax trap or other suitable zone for removal of the condensed products. The wax-free product stream is then further quenched with a second introduction of solvent to a temperature within the range of 0 to 100° C. to effect condensation of the normally liquid reaction products which are then separated into an aqueous phase and a hydrocarbon phase. Both phases are further processed, as discussed hereinbelow, for recovery of the individual products in each stream.

As a solvent I use a low-boiling aliphatic alcohol. Either methanol or ethanol are suitable for my process, and I prefer to use methanol.

The amount of solvent that is used in my process is variable. Sufficient solvent is usually used to reduce the temperature of the reaction products prior to separation of the aqueous and hydrocarbon phase to 0 to 100° C. Alternatively, the temperature reduction to 0 to 100° C. may be partially effected by the use of other cooling means, such as the use of tubes in the cooling zones containing a cooling fluid, the use of water-jacketed cooling zones, and the like, and, in that event, less solvent is required to effect the desired cooling than when the total cooling is effected by solvent introduction. When methanol is the solvent I prefer to use from 20 to 50 weight per cent methanol based on the weight of water in the product stream, but concentrations higher and lower than this preferred range may be used if essential or desirable.

The effect of the introduction of solvent, as described above, is to cause an increase in the concentration of oxygenated organic compounds in the aqueous phase. Substantially all of the oxygenated organic products containing no more than five carbon atoms per molecule are found in the aqueous phase. Introduction of the solvent also increases the amount in the aqueous phase of those oxygenated organic compounds containing more than five carbon atoms per molecule. I have found that there is a greater shift of $C_{5+}$ alcohols from the hydrocarbon phase to the aqueous phase than of the corresponding ketones and aldehydes since the higher boiling alcohols are more soluble in the aqueous solvent phase than the corresponding aldehydes and ketones.

The hydrocarbon phase, after shifting of the low-boiling oxygenated compounds to the aqueous phase, may be processed to recover a fraction boiling within the gasoline boiling range. Either the total hydrocarbon phase or only the raw gasoline from that phase, after being washed with alkali, may be treated with bauxite at about 370 to 430° C. to convert the oxygenated compounds to desirable olefins of the gasoline range. Thus, with my process the low boiling oxygenated products, which are not readily convertible to hydrocarbons boiling within the gasoline range, are recovered in their oxygenated form from the aqueous phase, and the hydrocarbon phase retains those difficultly separable high boiling oxygenated compounds which are readily convertible to gasoline range hydrocarbons. Instead of converting the oxygenated organic compounds in the hydrocarbon phase to olefinic hydrocarbons by bauxite treatment, these compounds may be recovered in the unconverted form from the hydrocarbon phase by any suitable process. Also, solvent may be recovered from the hydrocarbon phase by any suitable method, such as simple fractionation or water wash, and then recycled to the solvent quenching step. Actually the concentration of solvent in the hydrocarbon phase is relatively small, and in some instances it may not be economical to recover the solvent for recycling purposes.

Referring to Figure 1, synthesis gas comprising carbon monoxide and hydrogen enters reactor 1 via line 2 and it is contacted therein with a suitable hydrocarbon synthesis catalyst, such as an iron-, cobalt-, or nickel-containing catalyst, at conditions known to those skilled in the art for the formation of hydrocarbons and oxygenated organic compounds. I prefer to use a fluidized iron catalyst, and my process will be so described hereinbelow. Effluent from reactor 1 at a temperature of 320° C. and containing unconverted reactants, carbon dioxide, water, hydrocarbons and oxygenated organic compounds passes via line 3 to quenching zone 4. Sufficient methanol is introduced to zone 4 via lines 5 and 6 to lower the temperature of the reaction products to 250° C., and the reaction products and methanol pass via line 7 to wax trap 8 from which heavy waxy hydrocarbons are removed via line 9. Wax-free reaction products and methanol pass via line 10 to second quenching zone 11. Additional methanol is introduced to zone 11 via line 12 to lower the temperature of the reaction products to 0 to 100° C., and the reaction products and methanol pass via line 13 to accumulator 14. The normally gaseous, uncondensed components of the reaction effluent such as unconverted reactants, carbon dioxide and methane are removed from the system via line 15. If desired, these gases may be recycled to either reactor 1 or a synthesis gas producer (not shown). The hydrocarbon phase of the reaction product is removed via line 16. This phase contains normally liquid hydrocarbons, oxygenated hydrocarbon derivatives containing at least six carbon atoms per molecule and methanol. The methanol is present only in a small quantity, but if it is deemed economical to recover the methanol from the hydrocarbon phase, it can be recovered by simple fractionation or water wash and returned to the system via line 5. The methanol-free hydrocarbon phase may then be subjected to further treatment (not shown) to recover the oxygenated and hydrocarbon components of the phase by method known to those skilled in the art, or, if desired, the methanol-free hydrocarbon phase may be alkali-washed to remove organic acids, bauxite-treated to convert the oxygenated compounds to olefinic hydrocarbons and fractionated to obtain gasoline.

The aqueous phase from accumulator 14 which contains the oxygenated reaction products containing less than five carbon atoms per molecule and higher oxygenated reaction products passes via line 17 to fractionator 18 which is operated at about atmospheric pressure in a manner that the overhead, taken off via line 19, contains those components normally boiling or azeotroping at or below about 68° C., and this overhead is conducted to fractionator 22. This overhead from fractionator 18 contains alcohols, ketones, esters, aldehydes and some water. Ethanol is removed from fractionator 18 via line 20, and higher boiling oxygenated organic compounds are removed as the kettle product via line 21. If desired, this kettle product may be subjected to further separation steps. From fractionator 22 the low boiling compounds containing acetaldehyde, propionaldehyde, acetone, methyl ethyl ketone, n-butyraldehyde, ethyl acetate and a small amount of methanol are removed overhead via line 23. If desired, this overhead product may be subjected to further separation steps. A side stream of substantially pure methanol is recovered from fractionator 22 and recycled via line 24 to cooling zone or zones as shown. The higher boiling compounds are removed from fractionator 22 as the kettle product via line 25.

EXAMPLE

A hydrocarbon synthesis unit, operated with a fluidized iron catalyst at reaction conditions of 400 p. s. i. g., 315 to 320° C., 3000 v./v./hr. space velocity, 1:8:1 recycle ratio and 0.8 ft./sec. superficial linear velocity through the reactor, produces the following products per 1000 cubic feet of synthesis gas containing hydrogen and carbon monoxide in a 2:1 molar ratio:

*Pounds per 1,000 cubic feet synthesis gas*

| | | | |
|---|---|---|---|
| $CO$ | 0.39 | Acetaldehyde | 0.075 |
| $H_2$ | 0.35 | Acetone-methanol | 0.062 |
| $CO_2$ | 2.86 | Ethanol | 0.578 |
| $N_2$ | 1.11 | n-Propanol | 0.107 |
| $O_2$ | 0.03 | n-Butanol | 0.042 |
| $CH_4$ | 1.15 | n-Pentanol | 0.011 |
| $C_2H_4$ | 0.39 | Propionaldehyde mixture | 0.070 |
| $C_2H_6$ | 0.54 | Butyraldehyde mixture | 0.086 |
| $C_3H_6$ | 1.30 | Acetic acid | 0.205 |
| $C_3H_8$ | 0.29 | Propionic acid | 0.034 |
| $C_4H_8$ | 1.11 | Butyric acid | 0.017 |
| $C_4H_{10}$ | 0.29 | | |
| $C_5$—400° F | 4.36 | Other oxygen compounds | 0.093 |
| 400–700° F | 0.81 | | |
| 700+ ° F | 0.29 | | |
| Water | 12.32 | | |

By adding twenty weight per cent methanol, based on the weight of water in the product stream, to the reaction effluent stream prior to separation of the aqueous and hydrocarbon phases approximately fifty per cent of the oxygenated organic compounds from the hydrocarbon phase in addition to those normally recoverable in the aqueous phase are recovered in the aqueous phase. The additional oxygenated organic compounds recovered in the aqueous phase are primarily $C_2$ to $C_6$ alcohols, $C_3$ to $C_5$ ketones, $C_3$ to $C_4$ aldehydes and $C_4$ to $C_{10}$ organic acids. The additional oxygenated organic compounds recovered are those which are most readily separated and purified.

From the disclosure hereinabove numerous variations and modifications of my invention will be apparent to those skilled in the art.

I claim:

1. The method of recovering normally hydrocarbon-soluble oxygenated organic compounds from the effluent from the catalytic hydrogenation of carbon monoxide in the presence of a fluidized iron catalyst at a temperature within the range of 295–320° C. which comprises; adding to said effluent an amount of low boiling aliphatic alcohol selected from the group consisting of methanol and ethanol sufficient to reduce the temperature of said effluent to a temperature within the range of 200°–260° C.; separating condensed high boiling waxy hydrocarbons from the resulting cooled effluent; adding to said resulting cooled effluent an additional amount of said low boiling aliphatic alcohol to reduce the temperature of said effluent to a temperature within the range of 0°–100° C.; permitting said effluent to form two liquid phases; separating from said two liquid phases a liquid hydrocarbon phase having a substantially reduced oxygenated organic compound content and a liquid aqueous phase having a substantially increased oxygenated organic compound content.

2. A method according to claim 1 wherein the low boiling aliphatic alcohol is methanol.

3. A method according to claim 1 wherein the total quantity of added low boiling aliphatic alcohol is from 20–50 per cent by weight based on the water content of the hydrogenation reaction effluent.

4. The method of recovering normally hydrocarbon-soluble oxygenated organic compounds from the effluent of the hydrogenation of carbon monoxide in the presence of a fluidized iron catalyst at a temperature within the range of 295° to 320° C. which comprises: adding to said effluent an amount of methanol sufficient to reduce the temperature of said effluent to a temperature within the range of 0°–100° C.; permitting the resulting cooled effluent to form two liquid phases and separating from said two liquid phases a liquid hydrocarbon phase having a substantially reduced oxygenated organic compound content and a liquid aqueous phase having a substantially increased oxygenated organic compound content and containing substantially all of the oxygenated organic compounds present in said effluent which have five or less carbon atoms.

5. The method of recovering normally hydrocarbon soluble oxygenated organic compounds from the effluent from the catalytic hydrogenation of carbon monoxide in the presence of a fluidized iron catalyst at a temperature within the range of 295°–320° C. which comprises: adding to said effluent an amount of methanol sufficient to reduce the temperature of said effluent to a temperature within the range of 200° to 260° C.; separating condensed high boiling waxy hydrocarbons from the resulting cooled effluent; adding additional methanol to the cooled effluent, the total amount of added methanol being equivalent to 20 to about 50 per cent by weight of the water content of said effluent to reduce the temperature of said effluent to a temperature within the range of 0°–100° C.; permitting said effluent to form two liquid phases and separating from said two liquid phases a liquid hydrocarbon phase having a substantially reduced oxygenated organic compound content and a liquid aqueous phase containing substantially all of the oxygenated organic compounds containing five or less carbon atoms present in said effluent and having a substantially increased oxygenated organic compound content.

JOHN S. CROMEANS.

References Cited in the file of this patent

UNITED STATES PATENTS

| Number | Name | Date |
|---|---|---|
| 1,716,273 | James | June 4, 1929 |
| 1,870,816 | Lewis | Aug. 9, 1932 |
| 2,457,257 | Michael et al. | Dec. 28, 1948 |
| 2,472,219 | Lyons | June 7, 1949 |
| 2,472,837 | King | June 14, 1949 |
| 2,476,920 | Segura | July 19, 1949 |
| 2,494,371 | Wadley | Jan. 10, 1950 |
| 2,505,752 | Burton | May 2, 1950 |

OTHER REFERENCES

U. S. Technical Mission in Europe, August 2, 1946, page 85.